United States Patent [19]

Eschbach et al.

[11] 4,004,373
[45] Jan. 25, 1977

[54] EXTRUSIONS FOR PARTITIONS, WALLS AND ENCLOSURES

[75] Inventors: Robert C. Eschbach, Newport Beach; John B. Colligan, Glendale, both of Calif.

[73] Assignee: Aztec Manufacturing Company, Monrovia, Calif.

[22] Filed: Dec. 30, 1974

[21] Appl. No.: 537,477

Related U.S. Application Data

[62] Division of Ser. No. 325,461, Jan. 22, 1973, Pat. No. 3,866,381, which is a division of Ser. No. 884,812, Dec. 15, 1969, Pat. No. 3,712,005.

[52] U.S. Cl. .................................. 49/413; 49/449; 49/501
[51] Int. Cl.² ......................................... E05D 15/06
[58] Field of Search ............. 49/413, 449, 501, 504.

[56] References Cited

UNITED STATES PATENTS

| | | | |
|---|---|---|---|
| 3,078,524 | 2/1963 | Minick | 49/449 |
| 3,315,414 | 4/1967 | Nolan et al. | 49/449 |
| 3,808,742 | 5/1974 | Ehret et al. | 49/413 |

*Primary Examiner*—Kenneth Downey
*Attorney, Agent, or Firm*—Jones, Tullar & Cooper

[57] ABSTRACT

An extrusion for receiving and interconnecting laminated panel sections for quick construction of partitions or enclosures is disclosed. The extrusions form frame members for the partitions or enclosures and are designed to permit quick assembly and disassembly of building structures without the use of fasteners. The extrusions include channel portions adapted to receive the edges of the panels, the panels being grooved and adapted to snap into the corresponding channels. The extrusions may be H-shaped in cross section for forming panels into a flat partition or wall, may be formed with a channel on one side and adapted to receive door or window fittings on the other side, or may be formed in a corner unit configuration to permit joining of panels at right angles. The corner unit extrusion includes two interlocking half members which define a central cavity for receiving a rigid pipe, which prevents the interlocking members from being separated. The extrusions and panel sections are particularly adapted for use in constructing light-weight truck canopies, and for this purpose J-shaped interlocking extrusions permit quick connection of side panels to a roof panel and form a pivotal hinge for an access door.

5 Claims, 12 Drawing Figures

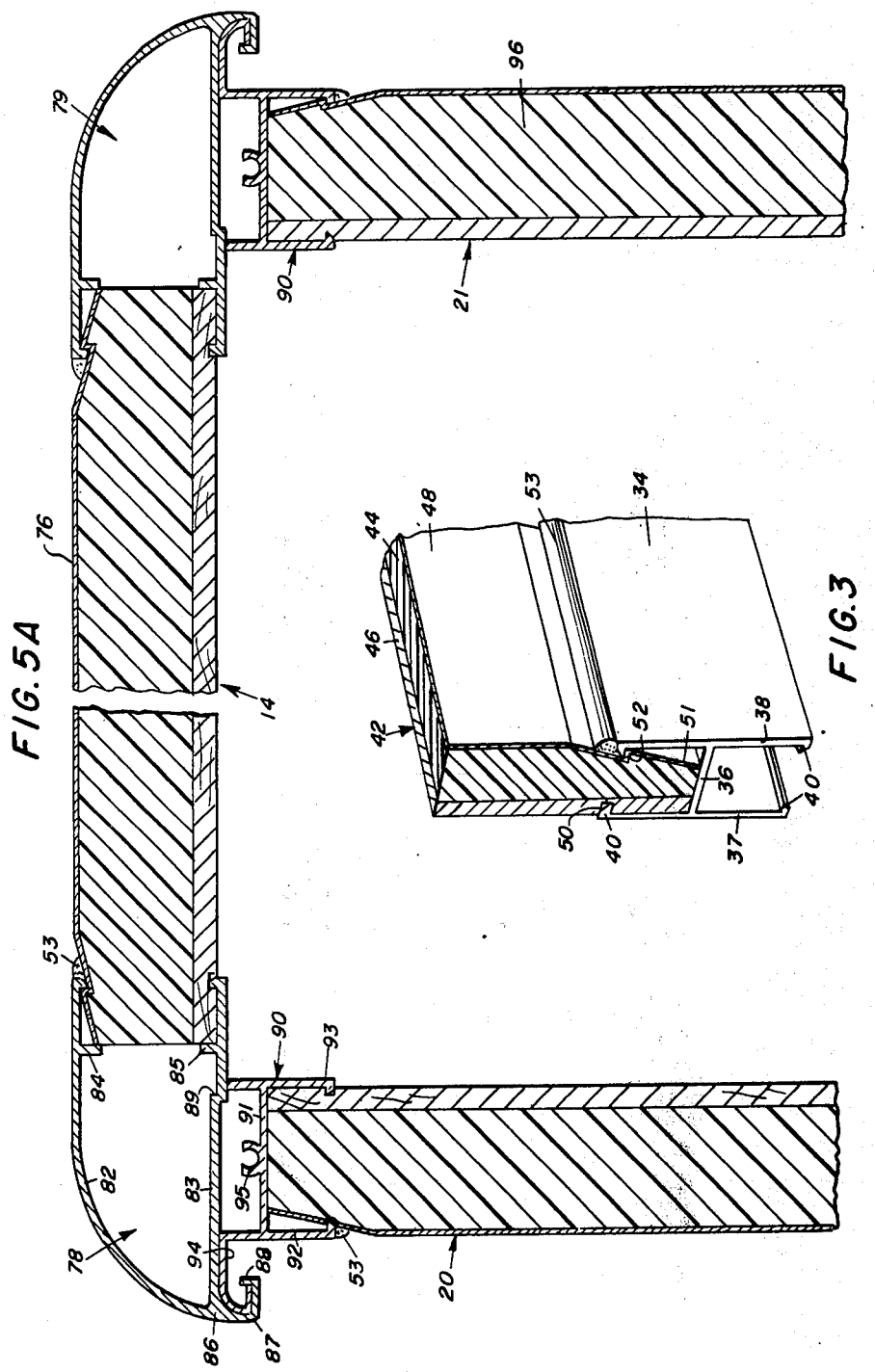

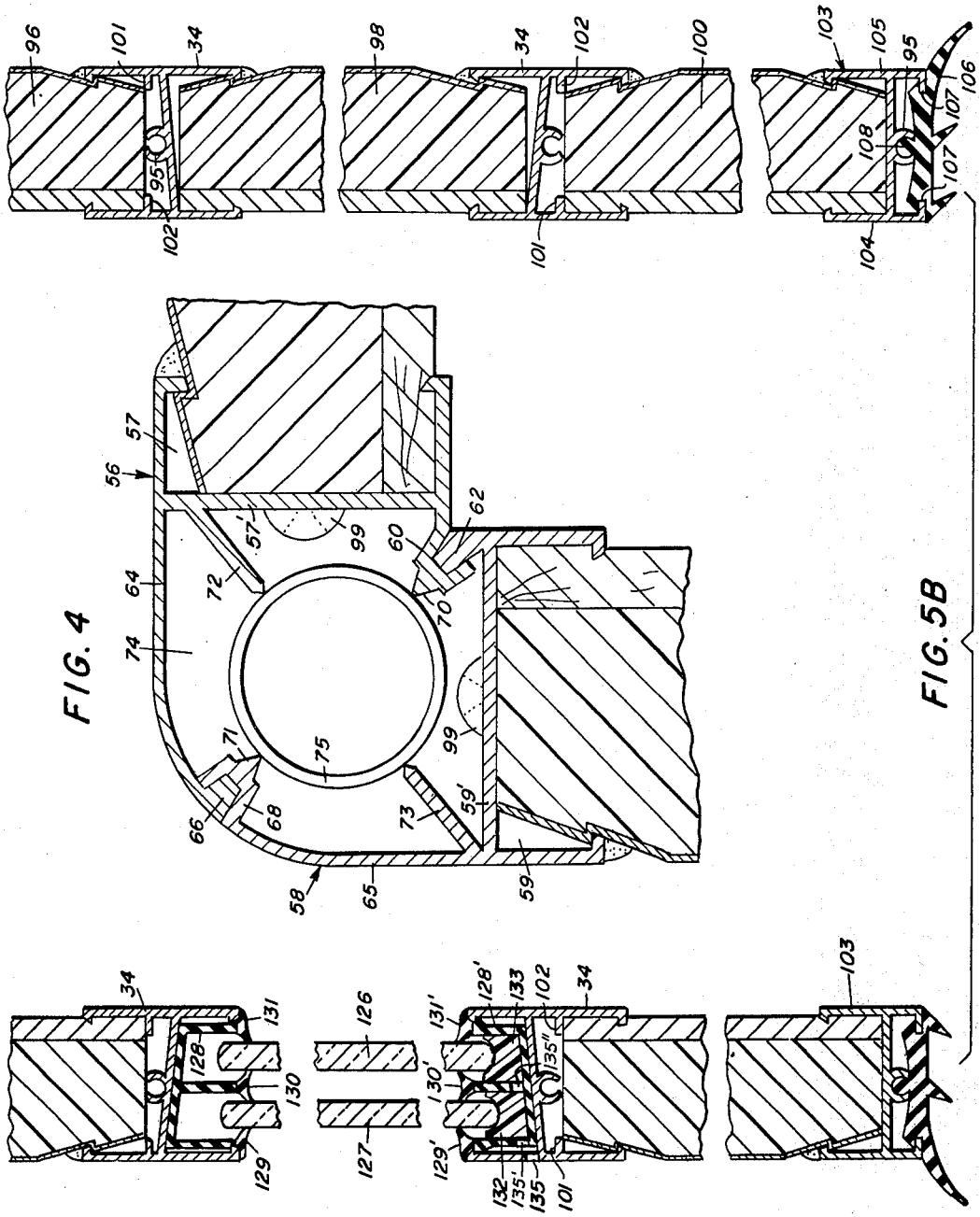

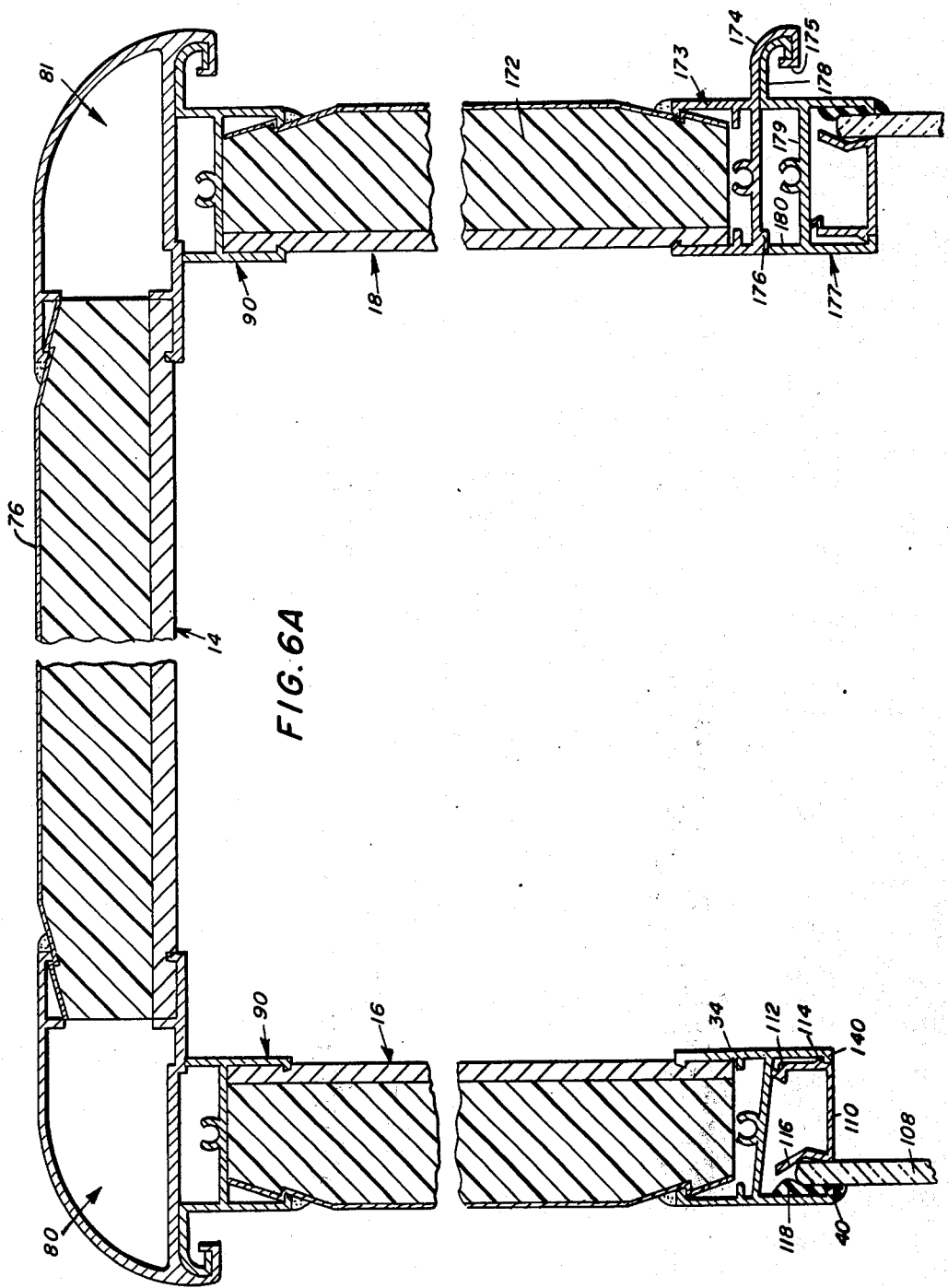

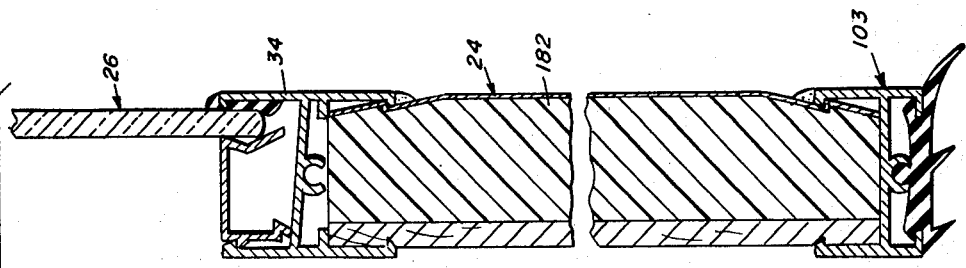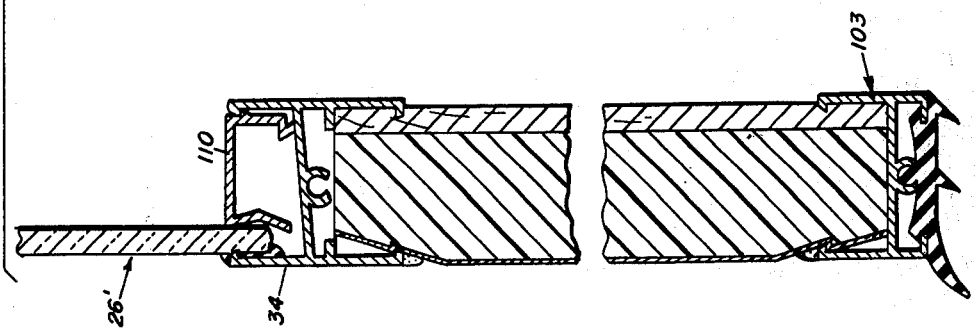
FIG.6B

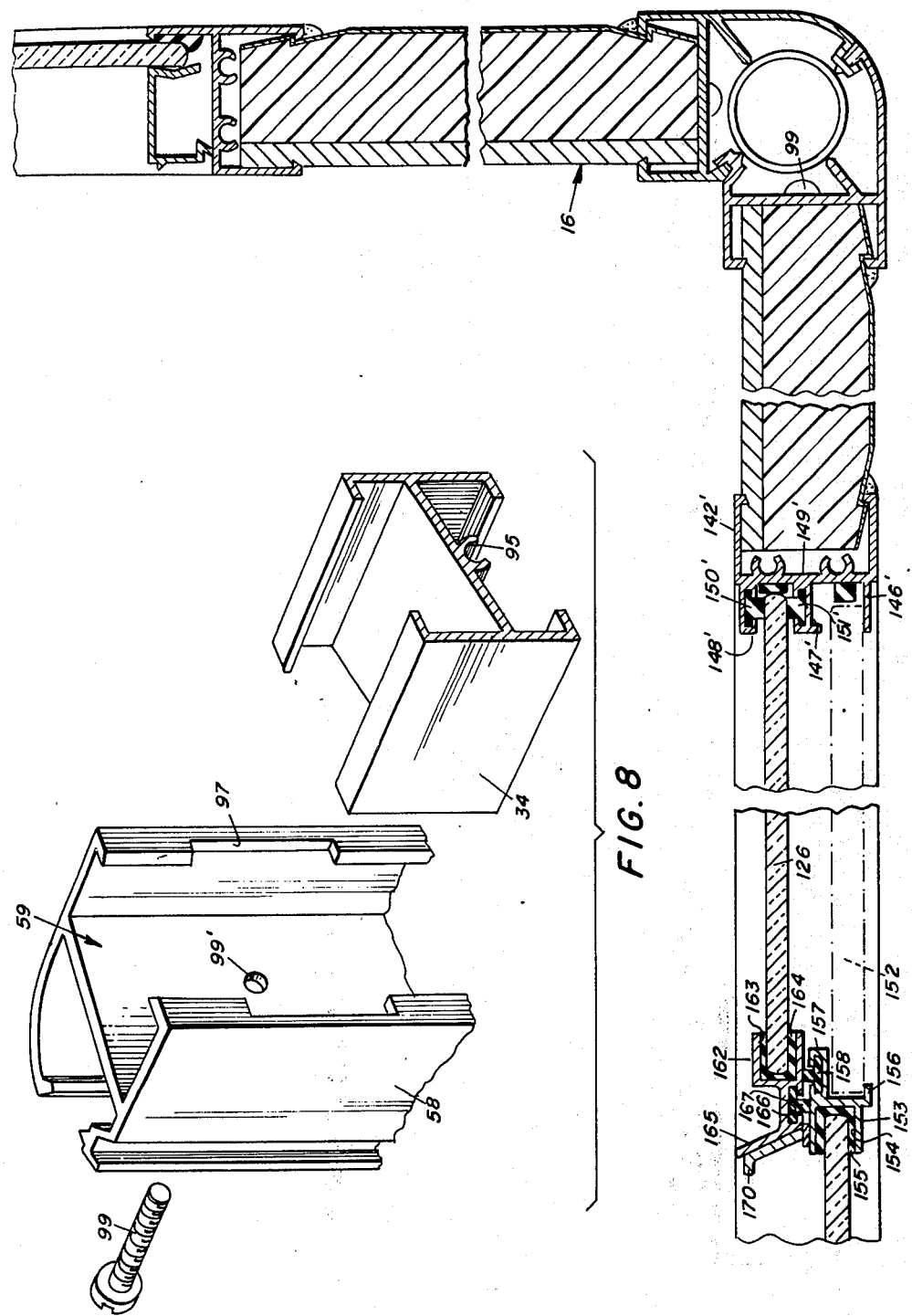

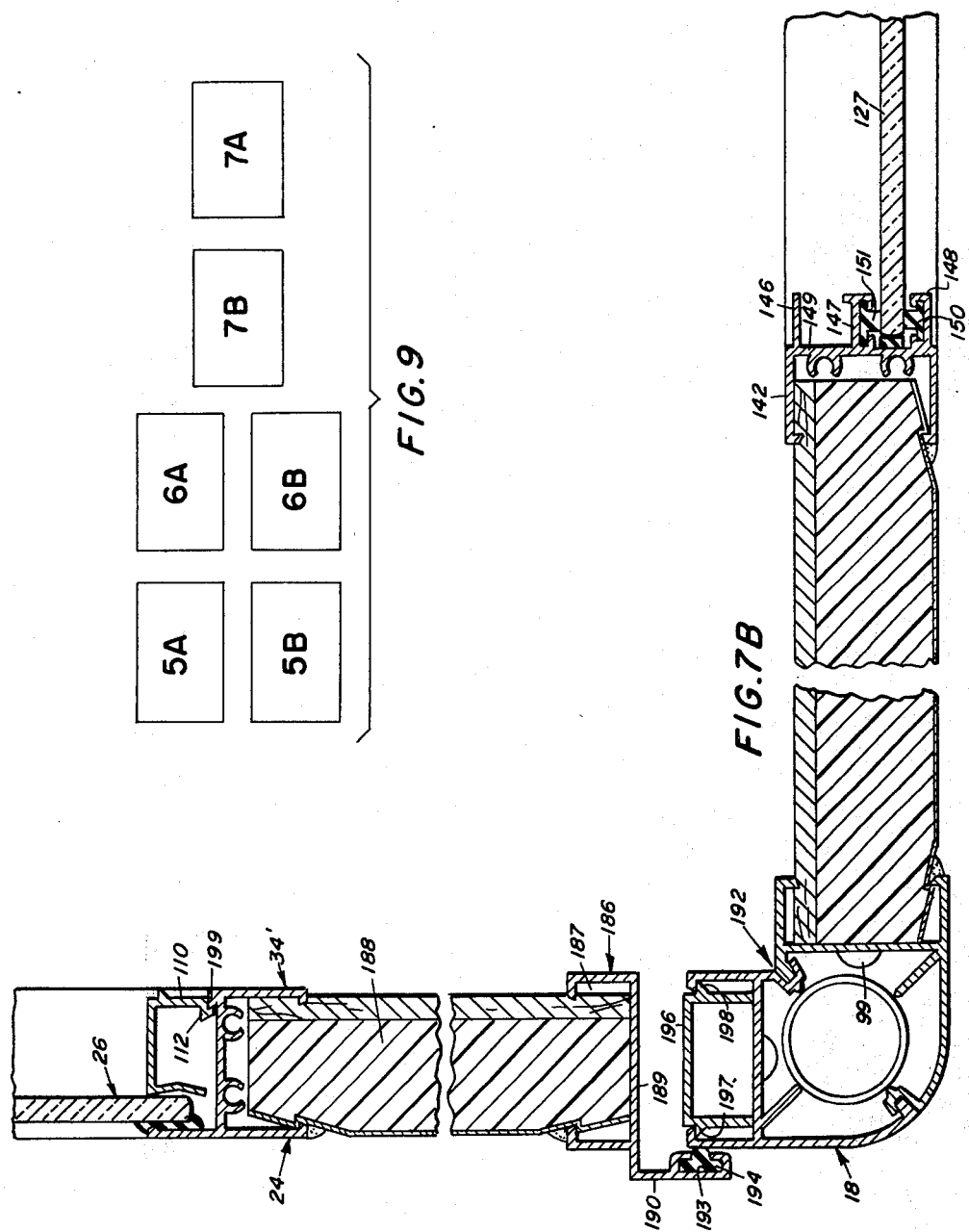

EXTRUSIONS FOR PARTITIONS, WALLS AND ENCLOSURES

This application is a division of application Ser. No. 325,461, filed Jan. 22, 1973, now U.S. Pat. No. 3,866,381 which issued on Feb. 18, 1975, which in turn is a division of application Ser. No. 884,812, filed Dec. 15, 1969, now U.S. Pat. No. 3,712,005.

BACKGROUND OF THE INVENTION

The present invention relates, in general, to extruded frame members and cooperating snap-in panels for forming building partitions and the like, and more particularly to specific extrusion forms which are adapted to cooperate with panels having grooved edges for permitting quick assembly and disassembly, without the use of fasteners, of walls, partitions and enclosures.

In the construction and building industries, the use of extruded frames adapted to receive panel boards or the like to form partitions or enclosures has become a major building technique. Such construction has been used in a variety of forms, particularly for interior walls or dividers. Such frame-supported panel boards can be used to divide or partition large offices or warehouses, or may be used as outer walls for enclosures constructed to form temporary schoolrooms, outdoor shelters, trailers, and the like. Thus, there is an increasing need for portable, light-weight building structures which may be easily assembled or disassembled, and which are simple and economical to manufacture, while at the same time being substantial, durable, and suitable for a variety of uses.

In the past, many different designs and structural features have been suggested and used for these purposes; however, the light-weight portable structures now known in the art are not entirely satisfactory for several reasons. For instance, in many building enclosures which use extruded frames and panels, there is no uniformity in the type of extruded frames so that various designs must be used in different locations within the structure, thus complicating construction. Also, the panels and extruded frame members generally can only be applied to one specific structure, and a single design generally is not suitable for varying structures such as divider partitions, temporary schoolrooms or shelters. Thus, each type of structure must be specifically designed and extrusions and panels formed for the particular purpose to which they are to be applied. This tends to increase the cost of the use of such materials, rather than providing the economy which is essential for commercially competitive structures. If such panels and frame structures are not light weight, economical to manufacture, and simple to assemble so that the amount of labor and time required for fabrication of a structure is decreased, such partitions will not be able to compete in the open market with standard wall board construction.

Another area in which light-weight building enclosures of the type disclosed herein are particularly useful is in the trailer or pickup truck canopy art. Such canopies, which are in common use today on pickup trucks, are basically constructed of thin-walled panels carried in extruded frames. However, the prior art canopies are not collapsible, and thus require extensive periods of time to assemble and disassemble. Such prior devices generally must be fabricated as a completed, assembled structure at the manufacturer's plant and shipped as such, requiring special tools and equipment which are not generally available to the truck owner. Further, once assembled they cannot easily be stored when they are to be removed from the truck, because they cannot be readily collapsed. When it is desired to provide windows in the partition structures formed by the panels and extrusions of the prior art, it was necessary to cut out a section of the panel and insert specially formed window frame members. Such construction added to the cost of the partition, not only because of the wasted material from the cut out portion, but because additional special extrusions were required to form the window frame. Further, in such an arrangement, the window frame does not form a part of the panel supporting structure, but merely fits within the cutout, and thus detracts from the strength of the panel, rather than adding to it.

Another drawback to present day construction is that a large number of fasteners is normally required to attach the panels to the frame extrusions. Such fasteners not only detract from the appearance of the partitions so formed, but when they appear on the outside surface of the wall or enclosure, they produce additional openings, or breaks, in the exterior surface which may admit air or water, and which thus reduce the effectiveness of the structure. In addition, such fasteners must be individually placed and secured, thus making the assembly of such structures extremely time-consuming so that the labor costs in assembly override any initial savings in materials.

Although the prior art relating to building enclosures and structures describes many different types of partitions, window units, connecting extruded frame units, and the like, such presently known structural features do not eliminate the problems described above.

SUMMARY OF THE INVENTION

It is, therefore, an object of the present invention to provide an extrusion which can be used in combination with a laminated panel structure to form a partition or enclosure structure.

Another object of the invention is to provide a partition or enclosure which may be assembled without the use of fasteners, or with a minimal number of internal fasteners so that none will be exposed on the exterior of the structure.

Still another object of this invention is to provide a unique corner extrusion unit for use in joining panels at right angles, which corner unit can be easily assembled and disassembled without the use of fasteners.

Still another object of the invention is to provide a unique sliding window unit which may be used with the laminated panels of the present invention to form a partition, canopy wall, or the like, wherein the window unit forms a part of the structure and does not require cutting out of portions of a panel.

Still another object of this invention is to provide in a sliding window unit an extruded frame which incorporates a vinyl track member for carrying the windows, permitting the windows to slide smoothly while providing a watertight seal.

Still another object of the invention is to provide a light-weight collapsible structure which can be easily assembled and disassembled, the disassembled parts being of a size to promote easy storage.

Still another object of the invention is to provide a building structure which has a variety of uses, wherein common arts may be used to construct a variety of structures such as trailers, truck canopies, outdoor storage rooms, temporary classrooms, room dividers, partitions, and the like.

Still another object of this invention is to provide a building structure which requires very little time and labor to assemble and disassemble, thereby providing economy in fabrication.

These and other objects are accomplished by the present invention through the use of an extruded frame member which forms an extrusion joint adapted to receive and secure laminated panels to form partitions or enclosures. The extruded joint has a generally H-shaped cross section, with the outer end of each leg carrying an inwardly turned flange designed to cooperate with corresponding grooves on the laminated panels. The edges of the panels are slightly tapered, allowing the panels to fit into the channels formed on opposite sides of the extruded joint sufficiently far to allow the inwardly turned flanges to snap into the grooves. When the panels are so snapped into place, the panel and extrusion are firmly secured together without the requirement for conventional fasteners such as screws, bolts, and the like. The oppositely disposed channels on this form of extrusion permit formation of flat walls or partition sections by joining laminated panels in edge to edge relationship.

In another form of the extrusion, two interlocking half member extrusions form a corner column unit so that panels may be joined at right angles. The corner unit extrusions are so formed that, when interlocked, they provide a central cavity adapted to receive a pipe which engages ridges and projections inside the half member units to prevent the interlocking members from being separated. The non-interlocking edges of the corner extrusion half members are formed with channels having legs and inwardly turned flanges which are adapted to receive and hold grooved panel members.

Stationary and sliding window units are provided for use with the partition or enclosure formed with the above extrusions. The sliding window is carried in an extruded frame which incorporates a vinyl track with flexible flanges to provide a guide for the sliding windows as well as providing a watertight seal. The window unit extrusions are also provided with channels which are adapted to receive the grooved wall panels of the present invention. Where the panels are interconnected to form an enclosure, such as a truck canopy, a lift up door may be located in one of the walls of the enclosure. This door may be hinged to the enclosure by means of interconnecting J-shaped extrusions on both the partition and the upper edge of the door to form a pivotal hinge. Similar J-shaped extrusions may be provided along the top edge of the side panels which are to form the four walls of an enclosure for interconnection with similar extrusions on a roof panel. Such an interconnection between the roof and wall permits quick assembly of the walls to the roof portion, for the J-shaped extrusions may be interconnected and the walls swung into right angle relationship to the roof section to assemble the enclosure without the use of fasteners. Where the corners of the wall panels utilize the corner unit of the present invention, the corners may be interlocked, and suitable pipes placed within the corner unit extrusions to complete assembly of the enclosure. Wall units may be formed from a plurality of panels interconnected in edge to edge relationship by the joint extrusions described, with window units being substituted for the laminated panels, where desired. The wall units may be formed into enclosures by the use of the corner unit extrusions described herein, and the walls may be assembled to a roof section to complete the enclosure through the use of suitable J-shaped extrusions. Thus, the present invention permits the assembly of a variety of building structures through the use of a minimal number of different extrusion types, together with suitable grooved panels for quick economical assembly as well as economical manufacture.

BRIEF DESCRIPTION OF THE DRAWINGS

The foregoing and additional objects, features, and advantages of the invention will be apparent to those skilled in the art from the following detailed description of a preferred embodiment thereof, taken with the accompanying drawings, in which:

FIG. 3 is a detailed view of a typical joint extrusion and its associated partition panel;

FIG. 4 is a detailed view of a typical interlocking corner unit constructed in accordance with the present invention;

FIGS. 5A and 5B are portions of a cross-sectional view of the truck canopy of FIG. 1, including a sectional view of the sliding window unit, and taken along line 5—5 of FIG. 1;

FIGS. 6A and 6B are portions of a cross-sectional view taken along line 6—6 of FIG. 2, showing a section of the truck canopy with a J-shaped roof and partition connection, a single window unit, and a J-shaped lift up door connection;

FIGS. 7A and 7B are portions of a cross-sectional view taken along line 7—7 of FIG. 1 and showing a sliding window unit and a lift up door in the rear partition of a canopy;

FIG. 8 is is an exploded view of an extrusion junction; and

FIG. 9 illustrates the relationship between the various sheets of drawings.

DESCRIPTION OF A PREFERRED EMBODIMENT

Figure 1:
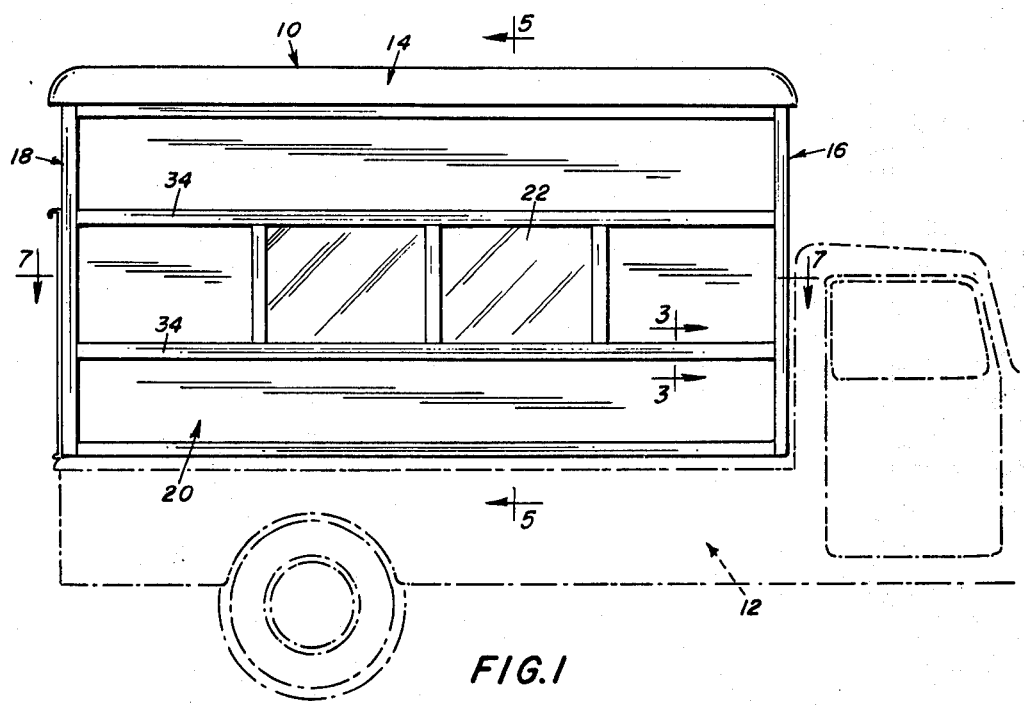
FIG. 1 is a side view of a truck carrying a canopy constructed in accordance with the present invention, and showing a sliding window unit in a side wall of the canopy.

Referring more particularly to the drawings, in FIG. 1, the numeral 10 indicates a canopy enclosure constructed in accordance with the present invention and utilizing the extrusion members and corresponding panels to be described. The canopy enclosure is mounted on a vehicle generally indicated at 12, and which may be a standard pickup truck. The canopy includes a roof assembly 14, a front partition or wall 16, a rear partition or wall 18, and first and second side partitions, or walls, 20 and 21, respectively, the side partition 20 being visible in FIG. 1 and partition 21 being located on the opposite side of the truck and not visible in this view. The first side partition 20 is illustrated as having a sliding window unit 22 carried therein, but it will be apparent that different or additional window units may be included in this and the other partitions, where and as desired. The truck canopy 10 has a lift up door 24, as illustrated in the rear view of the canopy shown in FIG. 2, which door forms a portion of the rear partition 18. The door is shown with a single window unit 26 located within the lift up door portion. The front wall 16 and the side wall 21 may also include sliding or non-sliding window units, as desired, the particular arrangement depending upon the use to which the canopy is to be placed.

Figure 2:
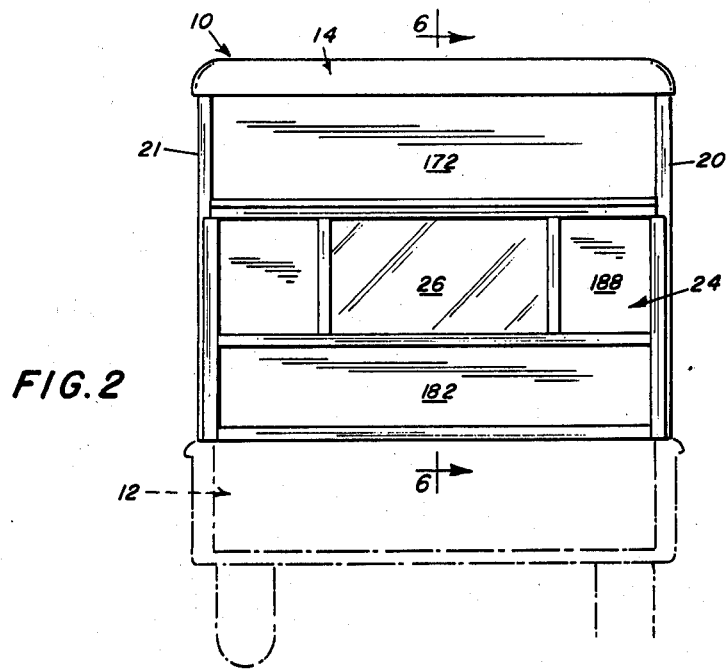
FIG. 2 is a rear view of the truck-mounted canopy showing a rear partition of the canopy enclosure which includes a lift up door according to the subject invention.

It will be understood that the canopy of FIGS. 1 and 2 is merely illustrative of a particular utility for the partitions of the present invention, and provides a convenient method of illustrating the various extrusion members which comprise the present invention. Thus, it will be understood that the various features of the present invention illustrated with respect to the canopy of FIGS. 1 and 2 may also be used in partitions, walls and enclosures of various types where the structure and features of the present invention are particularly advantageous.

EXTRUDED PANEL JOINT

The basic structure from which the various partitions and walls of the present invention are formed consists of a grooved laminated panel and a corresponding extrusion having a channel adapted to receive and grip the panel. Where panels are to be fastened together in edge to edge relationship to form a wall surface, the extruded joint 34 of FIG. 3 is typically used. This joint extrusion, which preferably is made of a material such as aluminum, generally has an H-shaped cross section to form two oppositely disposed channels separated by a web 36. The channels are formed by parallel leg plates 37 and 38, with web 36 forming the bottom, or base of both channels. At the outermost ends of the leg plates are inwardly turned flanges 40. These flanges, which extend the full length of the extrusion, are adapted to fit into corresponding grooves carried on a panel such as that indicated generally at 42.

The panels from which the partition or wall is formed may be of any suitable construction, but preferably is laminated from various materials to form a structure having the desired insulation, weather resistant, and appearance characteristics. Thus, as illustrated in FIG. 3, the panel 42 may include a core 44 of a material such as styrofoam sandwiched between a pair of exterior sheets 46 and 48, thus forming a panel having a resilient side and a rigid side. The sheet 46 may be of a rigid material such as Lauan plywood with a vinyl overlay, the plywood giving structural integrity, with the vinyl providing the desired appearance. Sheet 48 may be of a flexible material such as prefinished stucco embossed aluminum of approximately 0.019 inch thickness. In constructing the panel, a kerf 50 is cut into the rigid sheet 46 adjacent the edges of the panel. The kerf is spaced from the edge of the panel by an amount approximately equal to the depth of the channels formed in the extrusions, and is of a depth sufficient to receive the flanges 40. A groove 52 is pressed into the flexible sheet 48 adjacent the edges of the panel, and opposite the kerf 50. This groove may be formed by passing the panel through a rolling die, for example. The die also depresses the edge of the panel, as indicated at 51, so as to produce a slight taper at the edge of the panel, reducing the thickness of the panel to facilitate its insertion into the channel of the extrusion joint.

To assemble a wall or partition, panels such as the one indicated at 42 are pressed into the channels on the joint extrusion 34 sufficiently far to allow the flanges 40 to snap into the kerf and groove along the edges of the panels. This is accomplished by tilting the panel slightly so that one of the flanges 40 snaps into the kerf 50, and then pressing the flexible sheet inwardly and slightly tilting the panel so that the other flange engages groove 52. A bead of sealing material 53 of any suitable kind can then be injected into the upper portion of groove 52 to provide a seal between the joint extrusion and the flexible sheet, thereby to waterproof the assembly. It will be apparent that any number of panels may be connected in edge to edge relationship by means of extrusions such as the joint extrusion 34, thereby permitting construction of walls or partitions of any desired size.

INTERLOCK CORNER UNIT

If it is desired to form an angular partition, or a corner for an enclosure, a corner unit extrusion such as that illustrated in FIG. 4 may be used. In this unit, first and second half members 56 and 58 are provided with channels for receiving panels and with interlocking joints so that they may be interconnected to form a columnar extrusion which will connect the panels at right angles. As shown, the corner extrusions have panel engaging and securing portions which are similar to the channels in the joint extrusion of FIG. 3. Thus, the channels 57 and 59 formed on extrusion half members 56 and 58, respectively, include web portions 57' and 59', respectively and corresponding upstanding legs carrying inwardly turned flanges.

To form the interlocking joint between the two half members, the first corner half member 56 carries at its inner edge a generally U-shaped trough or track 60 with its open portion facing away from the center of the extrusion and toward the inner angle of the corner piece. This trough is arranged to receive a complementary obliquely projecting flange 62 carried by the second corner half member 58, flange 62 extending toward the center of the extrusion for interlocking relationship with the trough 60. The outer surface of the corner member is formed by outer side legs 64 and 65 extending from webs 57' and 59', respectively and curving toward each other to form a rounded exterior corner and to define a central cavity within the extrusion. The outer end of side leg 64 carries an inwardly turned oblique flange 66, while side leg 65 carries at its outer end an outwardly facing generally U-shaped trough, or track, 68 adapted to receive and interlock with the corresponding flange 66.

The troughs 60 and 68 are formed with inwardly facing ridges 70 and 71, respectively, the ridges extending along the bottom of the troughs and being opposite each other on the inner and outer corners of the corner unit. The half members 56 and 58 are also provided with inwardly extending projections 72 and 73, respectively, which are so positioned as to be directly opposite each other when the two half members are assembled, the projections being further positioned so that a line passing through the center of these projections is approximately perpendicular to a line connecting ridges 70 and 71. These projections and ridges extend into the cavity 74 which is formed by the interconnection of half members 56 and 58 and define a circular central area within the cavity which is adapted to receive a cylindrical holding member 75. This holding member may be, for example, a rigid vinyl tube which slides into the cavity 74 of the extrusion after the half members are interlocked, and preferably extends the full length of the extrusion. This pipe presses against the ridges 70 and 71 and is held in a central location by projections 72 and 73, thereby preventing the flanges 62 and 66 from becoming disengaged from their corresponding troughs 60 and 68. Thus, while the pipe 75 is in place within cavity 74, the corner unit is firmly held in interlocking relationship, without the use of fasteners such as screws, bolts or the like. Further, the corner unit may be quickly and easily disassembled merely by removing the vinyl tube 75, thereby permitting simple assembly and disassembly of the corner unit and partitions or enclosures formed therewith, without the use of special tools.

In order to illustrate the flexibility, economy, ease of use and convenience of the panel and extrusion system in forming walls, partitions, enclosures, and the like, a preferred embodiment of the invention is set forth in the form of a canopy for a pickup truck. This canopy includes four side partitions and a roof section, formed from joint extrusions, corner units and panels of the type disclosed in FIGS. 3 and 4, as well as other elements to be described. Where the elements are the same or similar to those illustrated in FIGS. 3 and 4, the numbering of these figures will be followed hereinafter for easy reference.

ROOF ASSEMBLY

Turning now to a detailed consideration of the canopy of FIG. 1, there is illustrated in FIG. 5 a sectional view taken along lines 5—5 of FIG. 1. The canopy of FIG. 5 includes side walls 20 and 21 and the roof assembly 14. The roof assembly includes a roof panel 76 which is constructed of a laminated material in the manner of the laminated panel 42 described and illustrated in FIG. 3. This roof panel is carried by four extruded roof frame members which include the side roof extrusions 78 and 79 and end roof extrusions 80 and 81 (illustrated in FIG. 6). The roof extrusions include channels having upstanding leg portions and inwardly turned flanges, while the roof panel 76 includes suitable kerfs and grooves adjacent its edges, whereby the roof panel can be snapped into the frame extrusion channels as described hereinabove. A typical roof extrusion 78 has upper and lower legs 82 and 83 which are extensions of the channel-forming legs which receive the roof panel. The bottom of the channel is defined by two inwardly extending projections 84 and 85, in the illustrated embodiment, although it will be apparent that a solid web may be provided, if desired. The upper leg extension 82 curves downwardly to meet the generally straight lower leg extension 83, whereby the upper portion 82 forms a smoothly rounded roof edge. At the junction 86 of the upper and lower leg extensions 82 and 83, an integral J-shaped flange 87 is formed, with the open portion of the J depending from the roof extrusion and opening toward the interior of the canopy. An upwardly turned restraining shoulder 88 is formed at the lowermost portion of flange 87. As illustrated, the lower leg extension 83 has an offset at 89 to accommodate the side panel which is to be attached to the roof panel. This offset may be of approximately the same dimension as the thickness of a typical extrusion so that the side and roof connection will form a 90° angle.

In forming the canopy roof, it will be apparent that the side roof frame extrusions should be cut at 45° angles or notched at each end for proper fitting of the roof extrusion frame to itself or to a corner casting; however, the abutting ends of these extrusions may be closed or joined in any suitable manner. Further, the junction preferably is covered by suitable fittings or sealants to assure a waterproof roof section.

SIDE AND END PARTITIONS

As illustrated in FIG. 5, the side panels of the enclosure may be constructed by joining a plurality of panels in edge to edge relationship through the use of the joint extrusions 34 described in FIG. 3. However, in order to fasten the side panels 20 and 21 to the roof panel 14, a suitable connector extrusion 90 is provided. This connector extrusion is adapted to provide a connection between the side panels and the roof assembly, and to this end includes a web portion 91 which defines the bottom of a U-shaped channel having depending leg portions 92 and 93, as viewed in FIG. 5A. The channel formed by this extrusion is adapted to receive the upper edge of a side wall panel in the manner heretofore described. The legs 92 and 93 extend upwardly beyond the web 91 to form the connection means for the extrusion. Thus, the leg 92 has at its upper end an outwardly extending J-shaped connection flange 94 which is complementary to and adapted to engage the J-shaped portion 87 of the side roof extrusion 78. The J-shaped flanges of the extrusions 78 and 90 may be interconnected by placing the side panel 20 generally parallel to the roof panel 14, hooking the end of the J-shaped flange 94 over the restraining shoulder 88, and then swinging the side panel to a position perpendicular to the roof panel. The J-shaped portions 87 and 94 then assume the relative position illustrated in FIG. 5A, while the opposite extension of leg 93 of extrusion 90 will come into contact with the lower extension 83 of the roof extrusion, thereby holding the two panels in the proper angular relationship.

As illustrated in FIG. 5, both the side panels 20 and 21 are connected to corresponding edges of the roof panel 14 in the manner described through the use of cooperating roof extrusions and connector extrusions. Similarly, the end panels 16 and 18 of the canopy are connected to roof panel 14, as illustrated in FIG. 6, which is a cross-sectional view of the canopy of FIGS. 1 and 2 taken along lines 6—6 of FIG. 2.

It will be noted that the connector extrusions 90, as well as many of the other extrusions illustrated herein, include a C-shaped channel, such as that indicated at 95, as an integral part of the extrusion web. Such channels are conventional on extrusions designed for interconnection of panel members, and permit the joining of longitudinal and transverse extrusions to form a frame. As illustrated in FIG. 8, an extrusion junction may be formed between a vertical channel element, such as channel 59 on corner half-member 58, and a horizontal extruded member 34. This junction may be used, for example, where a horizontal extrusion abuts a vertical extrusion, an opening 97 being formed in the vertical extrusion to receive the end of horizontal, thereby providing added strength. A screw 99 then may be passed through a hole 99' in the web of vertical extrusion 58 and threaded into the C-shaped channel 95. This may be used at the corners of each side and end wall panel to draw the corners of that panel up tight.

Normally, the panels which make up a partition for a wall or enclosure will be shop assembled, with the panels being snapped into their appropriate corner and joint extrusions, and the assembly being held together by suitable screws 99. The partitions and walls so formed are then ready for use and further assembly into building structures, enclosures, and the like.

The side and end partitions of an enclosure may consist of a single large panel carrying along its edges extrusions such as the corner units of FIG. 4, the edge connectors of FIGS. 5 and 6, or the like, whereby the panels may be interconnected into the desired enclosure configuration. To provide added flexibility of design in the construction of a variety of partitions and enclosures, smaller panels connected edge-to-edge by channel extrusions 34 may be used. In the illustrated truck canopy, for example, the side and end partitions are divided into three general sections, permitting the easy addition of window sections and the like. Considering FIGS. 5A and 5B, it will be seen that the side wall 20 includes upper, intermediate, and lower panels 96, 98 and 100. The adjacent panels are edge connected by horizontal joint extrusions 34 to form the partition, or wall, 20, while the periphery of the partition carries suitable extrusions such as corner half-members, roof edge connectors, and the like.

In the embodiment of FIGS. 5A and 5B, the central web of extrusion 34 is shown to be angled slightly with respect to the channel forming legs and to be formed with a C-shaped channel 95, and thus differs from the FIG. 3 illustration. This construction is provided so that when extrusion 34 is used at the bottom, or sill, of a window, as shown in FIG. 5B, water will drain toward the outside of the enclosure. For this purpose, suitable drain holes may be drilled in the outside leg of the extrusion 34, as will be described. Where the angled web construction is utilized with the C-shaped channel, a pair of projecting shoulders 101 and 102 may be provided to serve as stops for the panel which is to be inserted into the extrusion. These shoulders assure sufficient spacing for the C-shaped channel.

In order to adapt the illustrated canopy structure to use with a pickup truck, the lowermost side edge carries a bottom extrusion 103 which, as illustrated in FIG. 5B, includes a panel receiving channel on its uppermost side. The lower edge of the bottom extrusion carries depending L-shaped flanges 104 and 105, while the center web portion of the extrusion carries a C-shaped channel 95. The depending L-shaped flanges and the C-shaped channel 95 are adapted to receive a resilient strip 106 which is formed to interlock with flanges 104 and 105 and with the channel 95. Thus, the strip includes a pair of grooves indicated at 107 and a central head portion 108, the grooves receiving the flanges 104 and 105 and the head portion 108 fitting into the channel 95. Depending from the strip are a plurality of ridges, or flaps which serve to engage the sides of a pickup truck bed, providing a pad for the canopy and producing a waterproof seal between the canopy and the vehicle bed.

It will be noted that the general construction of the side wall 20 and the end walls 16 and 18 is similar to that described with respect to wall partition 21, and thus a detailed description of each will not be given. However, the various partitions may differ from the wall partition 21 by the addition of fixed or sliding window units or by the addition of an entrance door, and these variations will now be described with reference to FIGS. 5, 6 and 7.

SINGLE WINDOW UNIT

Referring now to FIGS. 6A and 6B, there is shown for purposes of illustration a fixed window unit 26 located in the lift up door portion 24 of the rear panel 18; similarly, a fixed window 26' is shown in the front partition 16. Both windows are similarly mounted, but for purposes of this description, reference will be made to the window unit 26'. As shown, a transparent window light, or pane, which may be laminated glass plate, is illustrated at 108. The window light is mounted in a rectangular frame formed by sections of the joint extrusion 34, the upper and lower edges of the window being secured in horizontal extrusions and the side edges of the plate being supported in vertically disposed extrusions (shown in FIG. 7B at 34'). As shown, the outer channels of the H-shaped extrusions 34 support the wall panels forming the partition, as in the previously described partition. However, the innermost channels which receive the window light 108 also receive U-shaped aluminum extrusions 110 which serve as clips to hold the glass plate in position within the extrusions 34. These clips 110 are each formed with a notch 112 at the end of an inward leg and a retaining ridge 114 located near the web of the clip on the same leg. The outer leg of the clip 110 is formed with a crease 116 near the web so that the end of the leg is angled over the edge of the glass plate 108 when the clip is installed. The clip is inserted in the innermost channel of the extrusion 34 and is held in place by the flange 140 which contacts ridge 114. A waterproof sealant of any suitable compound, such as putty or the like, is used around the edge of the channel where it contacts the plate 108 to help hold the plate in position and prevent the glass from directly contacting the flange 40 of the joint extrusion 34. The sealant compound is indicated generally at 118, and may be placed in the channel before the glass is inserted. A slight bulge or shoulder may be formed in the sealant compound at the edge of the window to assist in placement of the window light and to prevent it from shifting. It will be apparent that although both legs of the clip 110 are not shown in contact with the web of extrusion 34, the clips could be so designed. Further, if a more solid base is desired for retaining the windows, a suitable track or filler may be placed in the extrusion channels.

SLIDING WINDOW UNIT

The sliding window unit indicated in FIGS. 1, 5B and 7A–7B can be located in any of the partitions of the canopy, but in the illustrated embodiment is located in only the side partition 20. The window unit is supported at its upper and lower edges, as viewed in FIG. 5B, by typical joint extrusions 34, these extrusions forming the horizontal members of the window frame. The inwardly facing channels of extrusions 34 receive the laminated window lights 126 and 127. These window lights are positioned and laterally stabilized within the downwardly facing channel of the top extrusion by means of a vinyl track 128. The track is E-shaped in cross section, having depending legs extending downwardly outside the two window lights and having a central leg extending between the two lights. The track 128 is of a relatively rigid vinyl material, but carries at the lower ends of its depending legs flexible vinyl seals 129, 130 and 131 which serve to contact the window lights, or panes, 126 and 127, preventing them from rattling and providing a watertight and airtight seal.

In similar manner, the lower extrusion 34 carries in its upwardly facing channel a rigid vinyl track 128' which is similar to track 128 and which includes flexible vinyl tips 129', 130' and 131' to provide lateral stability to the window panes 126 and 127. In order to properly position the windows in the vertical direction, a pair of elongated support blocks 132 and 133 are positioned in the two tracks formed by the vinyl member 128'. The upper surfaces of the support blocks 132 and 133 are grooved so as to receive and guide the panes 126 and 127.

The E-shaped track members 128 and 128' are formed with elongated grooves or shoulders on each of the outermost legs which are adapted to engage the inwardly turned flanges of the joint extrusion 34, whereby the members 128 and 128' will be held firmly in their respective channels. All of the track members are notched and punched as at 135, 135' and 135" to provide a drain path for any water which might collect therein.

Referring now to FIGS. 7A and 7B, it will be seen that the ends of the window frame are formed by vertical extrusions 142 and 142'. Since these extrusions are identical, a single design may be used on either side of the window frame simply by reversing the extrusion. As illustrated, the extrusions are formed with a U-shaped channel facing away from the window and adapted to receive wall panels in the manner heretofore described. The portion of the extrusion facing toward the window panes consists of three parallel projections 146, 147 and 148 extending in a direction perpendicular to the web 149 of the vertical extrusion 142. The projections 147 and 148 are each formed with a longitudinal slot which is designed to receive a corresponding one of the suitable sealing members 150 and 151. The seals extend toward each other and are adapted to grip the edge of the corresponding window pane 127. In similar manner, the seals 150' and 151' are adapted to grip the edge of window pane 126. Sealing members 150 and 151 are made of a suitable material, such as woven pile weatherstripping, which will firmly support the window, and will provide an airtight and watertight seal.

The third extension 146 (and 146') on the vertical extrusion is adapted to receive a window screen 152, as indicated in FIG. 7A. Such a screen will normally be provided adjacent the pane in the sliding window unit which is movable; in this case, it is shown adjacent the window pane 126 which is located inwardly of pane 127 for easy access and movement.

To support the window panes 126 and 127 at the center of the window unit, whereby a seal between the adjacent edges of these panes may be provided, the ends of the windows may be supported, and a locking means may be provided, an outer center post extrusion 153 is vertically mounted in the center of the window frame unit by any suitable means. The center post extrusion includes a U-shaped channel 154 which is adapted to receive adhesive padding material 155 and a vertical edge of stationary window pane 127. The channel 154 and the support pad 155 cooperate with the upper and lower tracks 128 and 128' and the weatherstripping 150 and 151 to hold window 127 firmly in place. Center post 153 also includes a flange or shoulder portion 156 which cooperates with extension 146' of the vertical extrusion 142' to hold screen 152 in place. Finally, the outer center post extrusion 153 carries a slotted extension 157 which is adapted to receive woven pile weatherstripping 158 which extends toward the movable window pane 126 and serves to provide a seal between the center post and the movable window.

As has been set forth, one end of the sliding window pane 126 fits into the space between weatherstripping 150' and 151' in the vertical extrusion 142'; the other end of window pane 126 is gripped by an inner center post extrusion 162. This extrusion includes a U-shaped channel 163 which carries a suitable adhesive padding material 164 and which firmly grips the sliding window pane 126. This extrusion also includes a handle 165 by means of which the sliding window may be moved. The handle portion 165 includes a slot 166 adapted to carry suitable weatherstripping 167 for sealing engagement with the central post 153. A latch 170 may be secured to post 153 for engagement with handle 165 to prevent the sliding window from being opened. Thus, the sliding window 126 is supported by the upper and lower tracks 128 and 128' when open, and when closed additionally by the weatherstrip pads 150' and 151'.

LIFT UP DOOR

As was mentioned in the discussion of FIG. 2, a typical canopy will be provided with a suitable opening for access to its interior. The particular access door illustrated in the present disclosure may be generally described as a lift up door, preferably located in the rear partition 18. This rear door is illustrated in side elevation in FIGS. 6A and 6B and in a top view in FIG. 7B, to which Figures reference is now made. In this example, the rear partition includes an upper panel 172 which is secured to the roof assembly by means of a connector extrusion 90, as previously described. The lower edge of the panel 172 carries an upper door hinge extrusion 173 having an upwardly facing U-shaped channel adapted to receive the lower edge of panel 172 in a snap fit. The upper door extrusion 173 includes an outwardly extending J-shaped hinge flange 174 extending from the web of the extrusion and including a retaining shoulder 175. Located on the inner edge of extrusion 173 in a stop platform 176 which is adapted to prevent the lift up door from swinging too far inwardly when it is closed.

The lift up door 24 may include a window unit 26, as has been described, or may be formed of suitable panel members. In either case, the upper edge of the door portion carries a lower door hinge extrusion 177 which is adapted to cooperate with the upper hinge extrusion 173 to form a horizontal continuous hinge across the width of the door. Extrusion 177 is similar to the connector extrusion 90, and includes a J-shaped hinge portion 178 which cooperates with the J-shaped flange 174 of extrusion 173. The door hinge extrusion 177 includes a web portion 179 which carries along its outer edge the J hinge and along its inner edge an upstanding leg 180 which abuts the platform 176 when the door is closed, serving to properly position the door. The lower portion of door extrusion 177 consists of a downwardly opening U-shaped channel which is adapted to receive either the panel elements of the present invention or, as illustrated in FIGS. 6A and 6B, a window unit 26. A lower portion of window unit 26 is carried in a joint extrusion 34, the lower portion of which carries a lower door panel 182 to complete the lift up door.

As indicated, the lower edge of panel 182 carries a bottom extrusion 103 for sealing engagement with the rear gate of the truck bed. A suitable handle may be provided on the lower panel 182 or on its bottom extrusion 103 to permit the door to be opened pivotally upwardly on the J hinge 174, 178. As has been noted, the leg 180 on the upper door extrusion 177 contacts platform 176 so that when the door is closed it will be in vertical alignment with the rear of the canopy. It will be apparent that suitable latch and lock means may also be provided.

As viewed in FIG. 7B, the lift door 24 includes a vertical side edge extrusion 186 which extends the height of the door and which engages the rear corner units of the canopy. As illustrated, the vertical edge extrusion 186 includes a channel 187 which is adapted to engage the panels of the lift door partition, for example, the panel 188 which is adapted to fill the space between the window unit 26 and the side of the lift up door (see FIG. 2). The web 189 of the edge extrusion carries an L-shaped outwardly extending slotted flange 190 which extends in a direction to overlap the corner unit 192. The opening in the slot 193 carried by flange 190 faces the corner unit 192 and carries a resilient strip 194. This strip extends out of the slot opening and is adapted to engage the outer surface of the corner unit when the door is closed, thereby providing a watertight and airtight seal. Although FIG. 7B shows only one-half of the rear partition 18, it will be understood that the other half is a mirror image of the portion shown.

The corner unit 192 which is similar to the corner unit described in FIG. 4, is adapted for the door frame construction by the use of an insert 196 which is adapted to fit within the panel receiving channel of the corner unit. Insert 196 is formed with a pair of shoulders 197 and 198 which snap into engagement with the inwardly turned flanges in the corner unit channel, thereby retaining the insert 196 in the channel to form a relatively flat door facing.

As illustrated in FIG. 7B is a modified form of the extrusion 34 which is adapted for use as a vertical support for the window pane of the window unit 26. As illustrated at 34', the modified joint extrusion includes only three channel-forming legs, the fourth leg being replaced by a grooved shoulder 199. This shoulder is adapted to cooperate with the extruded aluminum glazing bead, or retaining clip 110 described above, whereby the groove in shoulder 199 receives the offset 112 of the clip. Such a modified joint extrusion may be used to facilitate insertion of the window pane in the frame formed by the horizontal and vertical joint extrusions. A similar extrusion structure is shown for the vertical frame members of the window unit 26', as illustrated in FIG. 7A.

CANOPY ASSEMBLY

As has been described, the various extrusions, window units, door constructions, and panels illustrated herein may be combined in various manners to provide building structures of any desired size or form. As an example of the ease with which the features of the present invention may be utilized to form a desired structure, a canopy enclosure has been specifically illustrated. The light weight, easily assembled and easily disassembled canopy which has been disclosed includes roof, side and end partitions which can individually be assembled by snapping the desired panels and window assembly combinations into corresponding joint extrusions, corner extrusions, partition top extrusions, partition bottom extrusions, and the like. As has been described, the window frames are formed from conventional joint extrusions, the panel top and door top extrusions provide J-shaped hinge extensions, and all the various elements are adapted to receive the grooved panels of the invention whereby a great deal of flexibility is provided with a minimum number of different parts.

In constructing a canopy, after all of the partitions are assembled into the desired sizes and configurations, the canopy may be assembled by placing the roof assembly upsidedown on a flat surface so that the interior surface of the roof panel faces upwardly. The four side and end partitions may then be connected to the roof assembly by hooking the J-shaped flanges 94 (see FIG. 5A) into the corresponding J-shaped flanges 87 of the roof section and swinging the partitions upwardly into a vertical position. When in this vertical position, the first and second half members of adjacent side and end panel corner unit extrusions may be interlocked, as shown in FIG. 4, and a rigid pipe 75 inserted into the cavity of each corner unit. When this has been done at all four corners of the structure, the rigid canopy structure is completed, and the canopy may then be placed on the bed of a vehicle such as a standard pickup truck and secured thereto by any suitable means. Assembly of the canopy is accomplished, therefore, without the use of any fasteners, and thus may be accomplished quickly and easily. Furthermore, disassembly is a simple matter, which may be accomplished merely by removing the vinyl pipe 75 from the corner units, thus permitting convenient handling and storage of the canopy.

It will be recognized from the foregoing description of a preferred embodiment of the invention that the present invention provides a unique extrusion joint for use in construction of partitions for such structures as dividing or enclosure walls. The joint extrusion permits the construction of such walls with no exposed fasteners. A unique interlocking corner unit is provided for use in constructing enclosures which can be easily assembled or disassembled without the use of tools or other special implements. Single and sliding window units and separate laminated panels provide an easy way to assemble partitions without the requirement of making special cuts for a window and thus wasting both time and material. The joint extrusion in combination with the laminated panels forms a light-weight, easily modified partition which is adaptable to easily assembled enclosures which may be disassembled to facilitate storage. The enclosure can be adapted for many purposes, although limited in this illustration to a truck canopy, but other uses will be apparent to those of skill in the art.

It will be apparent that the design varieties made possible by the present system are limited only by the imagination of the user, and that innumerable combinations and variations are possible; however, such variations are a part of the true spirit and scope of the present invention, as defined in the following claims.

We claim:

1. In a sliding window unit for mounting in a partition wall;

first and second spaced, substantially identical, horizontal extrusions having H-shaped cross sections defined by inwardly and outwardly extending spaced pairs of legs defining inwardly and outwardly facing channels;

first and second spaced, substantially identical, vertical extrusions each having inwardly extending spaced legs and an outwardly extending spaced pair of legs defining first and second inwardly facing channels and a first outwardly facing channel, respectively, said horizontal and vertical extrusions being interconnected to form a rectangular window frame having a central opening;

partition securing means on the outwardly extending legs of said horizontal and vertical extrusions for securing said window frame in a partition, said outwardly facing channels being adapted to receive said partition;

first and second parallel slots formed in the adjacent inwardly extending legs forming said first channel on each of said vertical extrusions;

a sealing member disposed in each of said parallel slots, said sealing members being disposed on opposite sides of each of said first channels of said vertical extrusions;

first and second window lights mounted in said central opening of said window frame, said first light covering approximately one-half of said central opening and being mounted for horizontal motion therein along said inwardly facing channels of said first and second horizontal extrusions between open and closed positions, and said second light covering the remainder of said central opening and being fixedly mounted therein, said second light being located in said inwardly facing channels of said first and second horizontal extrusions;

track means secured in said inwardly facing channel of each of said first and second horizontal extrusions, for receiving said window lights, each said track means comprising a track web having a center and two spaced outside finger flanges of rigid material, said finger flanges forming two parallel side-by-side trackways within the inwardly facing channel of each said horizontal extrusions, said first and second window lights being mounted in separate corresponding trackways;

flexible sealing means formed at and extending from the ends of each of said finger flanges to engage opposed surfaces of said window lights;

a rigid, elongated block within each of the trackways formed in the lowermost of said first and second horizontal extrusions, said blocks each having on the upper surface thereof a longitudinal recess for receiving and supporting a corresponding window light; and inner and outer vertical center posts, said outer post being fixedly mounted within said frame and being secured to one end of said second window light while the opposite end of said second light engages the sealing members of the first channel of the first one of said vertical extrusions whereby said second window light is secured in said frame, said inner post being movably mounted within said frame and being secured to one end of said first window light while the opposite end of said first window light is engagable with the sealing members of the first channel of the second one of said vertical extrusions when said first window light is moved to its closed position.

2. The sliding window unit of claim 1, wherein said outer center post includes channel means receiving said one end of said second window light, and further includes a sealing member adapted to contact said inner center post when said first window light is in its closed position.

3. The sliding window unit of claim 1, wherein said inner center post includes channel means receiving said one end of said first window lights, and further includes a sealing member adapted to contact said outer center post when said first window light is in its closed position.

4. The sliding window unit of claim 1, further including handle means mounted on said inner center post for moving said first window light, and latch means pivotally mounted on said outer center post and adapted to engage said handle to secure said first window light in its closed position.

5. The sliding window unit of claim 1, wherein said first and second vertical extrusions are oppositely disposed in said frame, whereby the first inwardly facing channel of one vertical extrusion and the second inwardly facing channel of the other vertical extrusion are aligned with one of said parallel trackways in said horizontal extrusions and the remaining inwardly facing channels of said vertical extrusions are aligned with the other of said parallel trackways for supporting said window lights in adjacent, parallel relationship in said window frame.

* * * * *